US007938215B2

(12) United States Patent
Leconte

(10) Patent No.: US 7,938,215 B2
(45) Date of Patent: May 10, 2011

(54) COOLER INSTALLATION

(75) Inventor: Valentine Daniel Joel Leconte, Cempuis (FR)

(73) Assignee: AGCO SA (FR)

( * ) Notice: Subject to any disclaimer, the term of this patent is extended or adjusted under 35 U.S.C. 154(b) by 428 days.

(21) Appl. No.: 12/159,422

(22) PCT Filed: Dec. 12, 2006

(86) PCT No.: PCT/IB2006/004054
§ 371 (c)(1),
(2), (4) Date: Jul. 24, 2008

(87) PCT Pub. No.: WO2007/077491
PCT Pub. Date: Jul. 12, 2007

(65) Prior Publication Data
US 2009/0038775 A1      Feb. 12, 2009

(30) Foreign Application Priority Data
Dec. 30, 2005   (GB) .................................. 0526621.8

(51) Int. Cl.
*B60H 1/00*           (2006.01)
(52) U.S. Cl. ............ 180/68.4; 180/68.6; 165/42; 165/86
(58) Field of Classification Search ........ 180/68.1–68.4; 165/41, 122, 67; 123/41.43; *B60K 11/04*
See application file for complete search history.

(56) References Cited

U.S. PATENT DOCUMENTS

| | | | | |
|---|---|---|---|---|
| 3,334,704 A * | 8/1967 | Gehrke et al. ............... | 180/68.4 |
| 3,727,712 A * | 4/1973 | Colloton ...................... | 180/305 |
| 3,834,478 A * | 9/1974 | Alexander et al. .......... | 180/68.6 |
| 4,542,785 A * | 9/1985 | Bagnall et al. .............. | 165/95 |
| 4,696,361 A * | 9/1987 | Clark et al. ................. | 180/68.4 |
| 5,234,051 A * | 8/1993 | Weizenburger et al. ..... | 165/41 |
| 5,435,264 A * | 7/1995 | Santiago et al. ............ | 117/92 |
| 5,492,167 A * | 2/1996 | Glesmann ................... | 165/41 |
| 5,730,240 A * | 3/1998 | Hoffman et al. ........... | 180/69.21 |
| 6,092,616 A * | 7/2000 | Burris et al. ................ | 180/68.1 |
| 6,196,916 B1 * | 3/2001 | Childs ........................ | 460/16 |
| 6,435,264 B1 * | 8/2002 | Konno et al. ............... | 165/41 |
| 6,880,656 B2 * | 4/2005 | Pfusterschmid et al. .... | 180/68.4 |
| 7,089,994 B2 * | 8/2006 | Esposito et al. ............ | 165/42 |
| 7,370,690 B2 * | 5/2008 | Rasset et al. ............... | 165/41 |
| 7,398,847 B2 * | 7/2008 | Schmitt ...................... | 180/68.4 |
| 7,401,672 B2 * | 7/2008 | Kurtz et al. ................. | 180/68.4 |
| 7,467,679 B2 * | 12/2008 | Honzek et al. .............. | 180/68.4 |

(Continued)

*Primary Examiner* — J. Allen Shriver, II
*Assistant Examiner* — James Triggs

(57) ABSTRACT

A tractor cooling installation has an engine cooling radiator (11) fixed relative to the tractor (16), a first inner bank of one or more coolers (12,13) pivoted on the radiator on a first frame (17) for upward pivoting movement away from the radiator about a first generally horizontal pivot axis (18) transverse to the tractor and a second outer bank of one or more coolers (14) also pivoted on the radiator on a second frame (20) for upward pivoting movement away from the first inner bank of coolers about a second generally horizontal pivot axis transverse to the tractor. A first cooler (12) from the first bank of coolers is mounted on the first frame (17) for pivoting upwardly with the first frame away from the radiator and a second cooler (13) which also forms part of the first bank of coolers is pivotally supported at its upper end by the first frame about a third generally horizontal axis (26). The lower end of the second cooler (13) is attached to the tractor by pivoting link means (27) so that as the first frame (17) pivots upwardly about the first axis (18) the second cooler pivots (13) relative to the first frame (20) about the third axis (26) to a location spaced from the first cooler (12) and the radiator (11).

13 Claims, 6 Drawing Sheets

U.S. PATENT DOCUMENTS

| | | | |
|---|---|---|---|
| 7,753,152 B2 * | 7/2010 | Nakae et al. | 180/68.1 |
| 7,771,177 B2 * | 8/2010 | Maillard et al. | 417/423.15 |
| 7,828,097 B2 * | 11/2010 | Kondou et al. | 180/68.1 |
| 7,886,860 B2 * | 2/2011 | Spieth et al. | 180/68.4 |
| 2003/0168269 A1 * | 9/2003 | Pfusterschmid et al. | 180/68.4 |
| 2005/0211483 A1 * | 9/2005 | Pfohl et al. | 180/68.1 |
| 2006/0005943 A1 * | 1/2006 | Rasset et al. | 165/77 |
| 2007/0007061 A1 * | 1/2007 | Meyer et al. | 180/68.1 |
| 2008/0230291 A1 * | 9/2008 | Kersting | 180/68.4 |
| 2008/0283214 A1 * | 11/2008 | Starkey et al. | 165/41 |

* cited by examiner

COOLER INSTALLATION

BENEFIT CLAIMS

This application is a US National Stage of International Application No. PCT/IB2006/004054, filed 12 Dec. 2006, which claims the benefit of GB 0526621.8, filed 30 Dec. 2005.

This invention relates to a cooling installation for use on an agricultural tractor or similar vehicle.

There is requirement to provide a simple and compact cooling installation for such vehicles which allows easy cleaning of such coolers as the engine radiator, intercooler and oil cooler and other coolers such as an air conditioning condenser. Such installations are conventionally housed at the front end of the vehicle under an engine hood which pivots upwardly to allow access to the coolers.

It is an object of the present invention to provide such a cooling installation which meets the above requirements.

Thus according to the present invention there is provided a tractor cooling installation comprising an engine cooling radiator fixed relative to the tractor, a first inner bank of one or more coolers pivoted on the radiator for upward pivoting movement away from the radiator about a first generally horizontal pivot axis transverse to the tractor, a second outer bank of one or more coolers also pivoted on the radiator for upward pivoting movement away from the first inner bank of coolers about a second generally horizontal pivot axis transverse to the tractor.

Preferably the first bank of coolers is mounted on a first frame which pivots about the first axis and the second bank of coolers is mounted on a second frame which pivots about the second axis. The first and second axes may be aligned with each other.

A first cooler from the first bank of coolers may be mounted on the first frame for pivoting upwardly with the first frame away from the radiator and a second cooler which also forms part of the first bank of coolers may be pivotally supported at an upper end from the first frame about a third generally horizontal axis, the lower end of the second cooler being attached to the tractor by pivoting link means so that as the first frame pivots upwardly about the first axis the second cooler pivots relative to the first frame about the third axis to a location spaced from the first cooler and the radiator.

Support means may be provided for holding the first frame in a pivoted spaced relation relative to the radiator.

Support means may also be provided for holding the second frame in a pivoted spaced relation relative to the first frame.

The support means may comprise gas struts which also assist in pivoting the/each frame relative to the radiator.

The frames may be interconnected so that, after a predetermined pivoting movement of the second frame away from the radiator, the first frame begins to pivot away from the radiator.

The first and second frames may be interconnected in the gas struts which act between the frames.

Latch means may also be provided for securing the frames in a closed uninvited position relative to the radiator.

The present invention will now be described, by way of example of only, with reference to the accompanying drawings in which.

Figure 1:
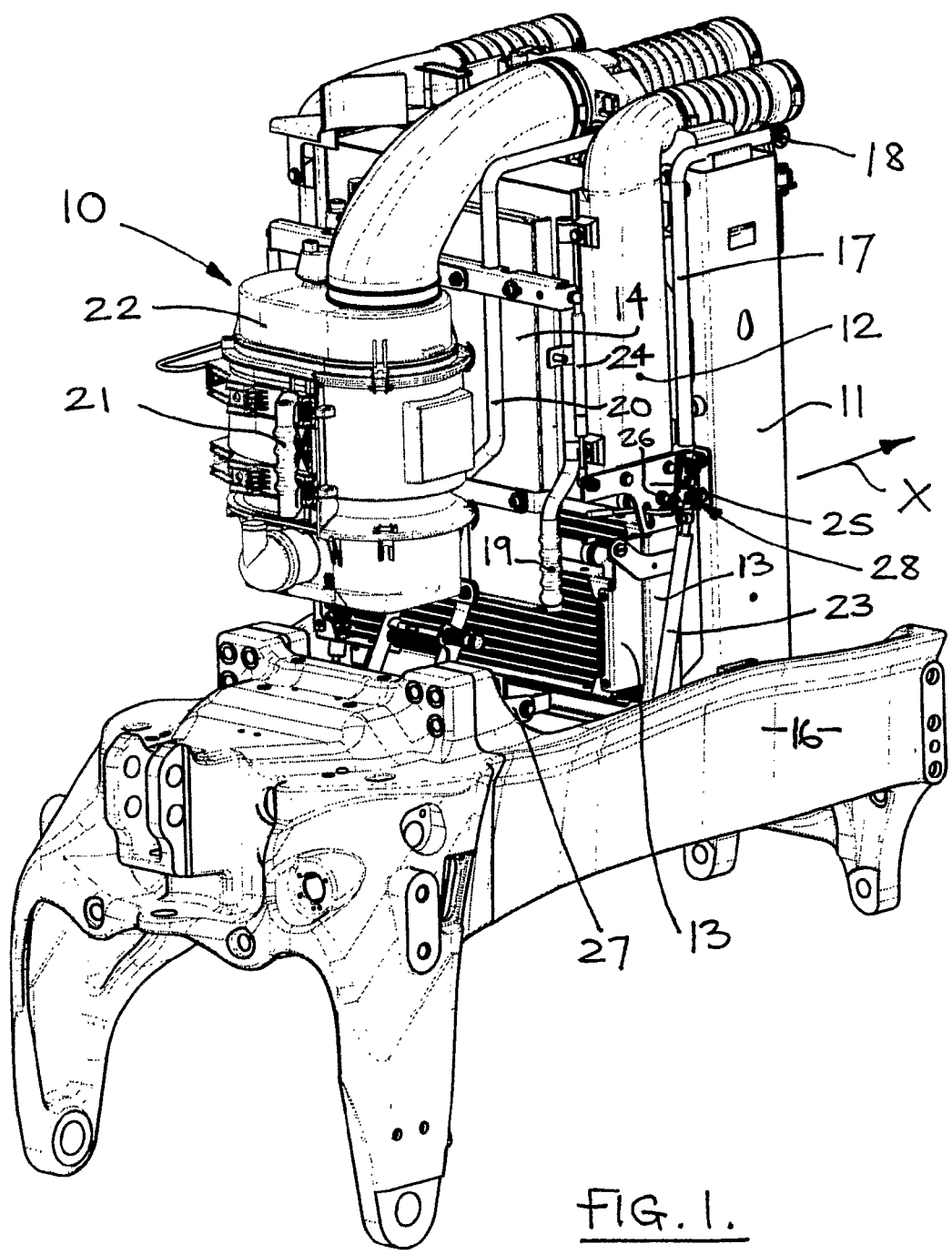
FIG. 1 shows a perspective view of a cooling installing for use on an agricultural tractor with all the coolers in their closed position.

Referring to the drawings, a cooling installation 10 for an agricultural tractor comprises an engine cooling radiator 11, an engine intercooler 12, one or two transmission oil coolers 13 and an air conditioning condenser 14. Air is drawn through these coolers in the direction X by a cooling fan diagrammatically shown at 15 in FIGS. 2 and 3, which is surrounded by an appropriate fan cowling arrangement (not shown).

In accordance with the present invention the engine cooling radiator 11 is rigidly fastened to a cast frame 16, which is bolted to the front of the engine (not shown) this cast frame also serves for the mounting of the front axle of the tractor.

The engine intercooler 12 and oil coolers 13 are pivoted from the radiator 11 on a first frame 17 for pivoting relative to the radiator about a first generally horizontal and transverse pivot axis 18. A first handle 19 is provided which is secured to the intercooler 12 and which can be used to pivot the intercooler 12 and engine oil coolers 13 relative to radiator 11 as will be described below.

Intercooler 12 and oil coolers 13 comprise a first or inner bank of coolers mounted immediately adjacent to the radiator 11. A second or outer bank of coolers is mounted a second frame 20 which is also pivoted on radiator 11 about a second generally horizontal and transverse axis which may be coaxial with the first axis 18.

Also mounted on the second frame 20 is an air filter 22. Secured to filter 22 is a second handle 21 which can be used to pivot the second frame 20.

A first support means in the form of a first pair of gas strut 23 assists in the pivoting in the first frame 17 relative to radiator 11 and also support the first frame in its fully opened position as will be described below.

Similarly a second pair of gas struts 24 assists in the pivoting of the second frame 20 relative to the first frame 17 and also holds the second frame in an open position relative to the first frame.

Figure 3:
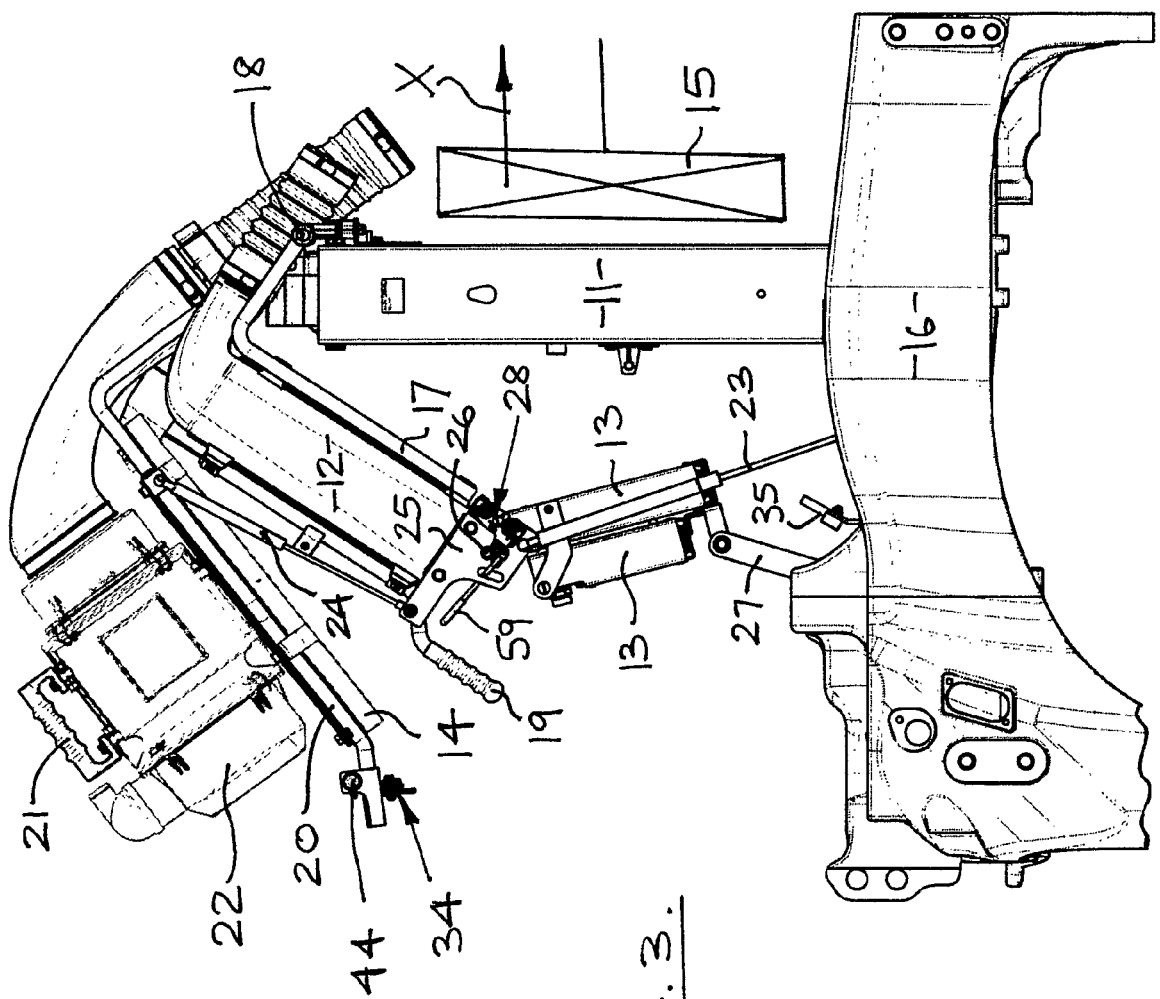
FIG. 3 shows a side view of the installation in a fully open condition.
Figure 4:
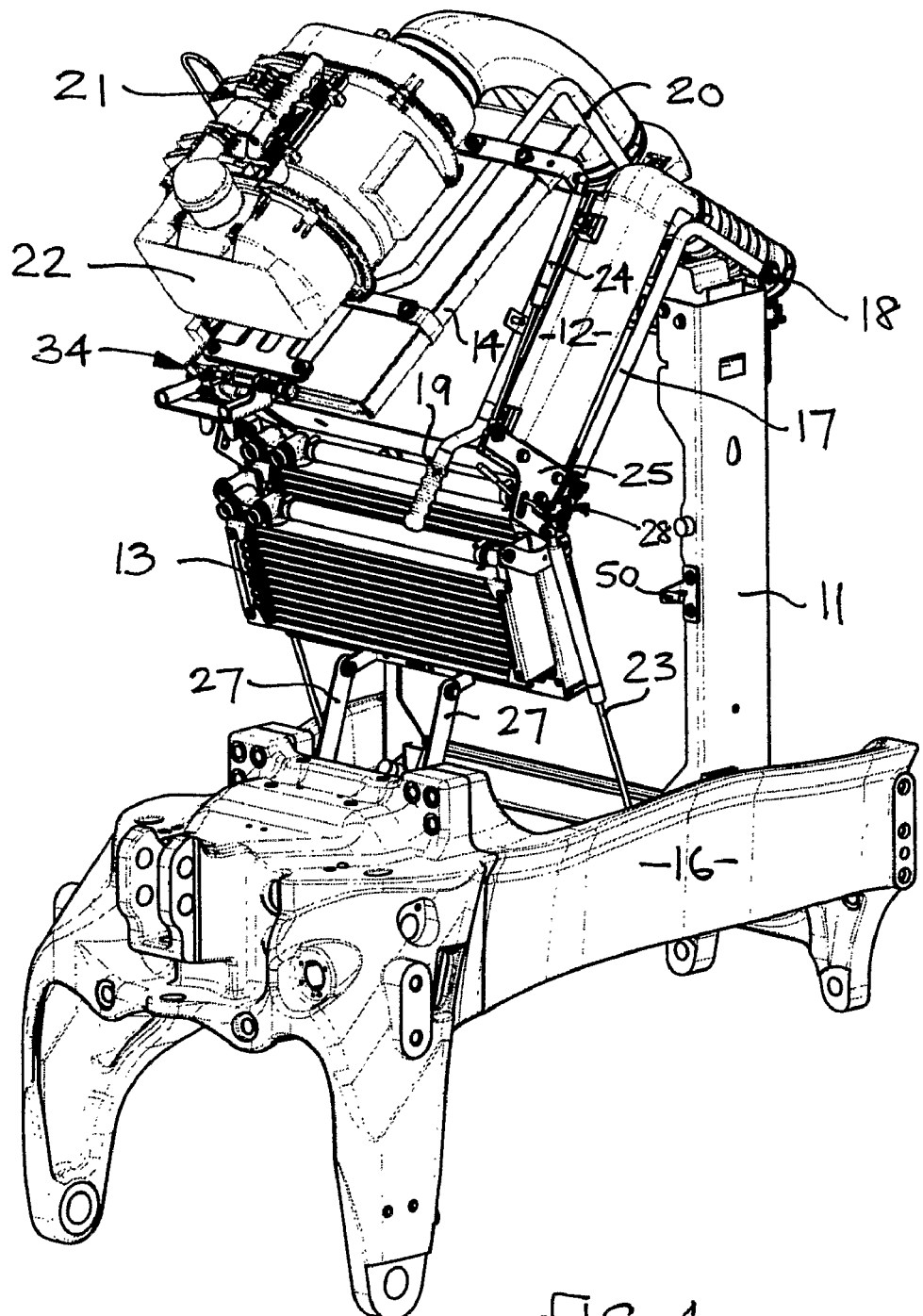
FIG. 4 is a perspective view corresponding to FIG. 3.

As best seen in FIGS. 3 and 4 the transmission oil coolers 13 is pivoted at its upper end on brackets 25 supported from first frame 17 for pivoting about a third generally horizontal transverse axis 26. The lower end of oil coolers 13 are connected via pivoting links 27 with the frame 16.

Figure 2:
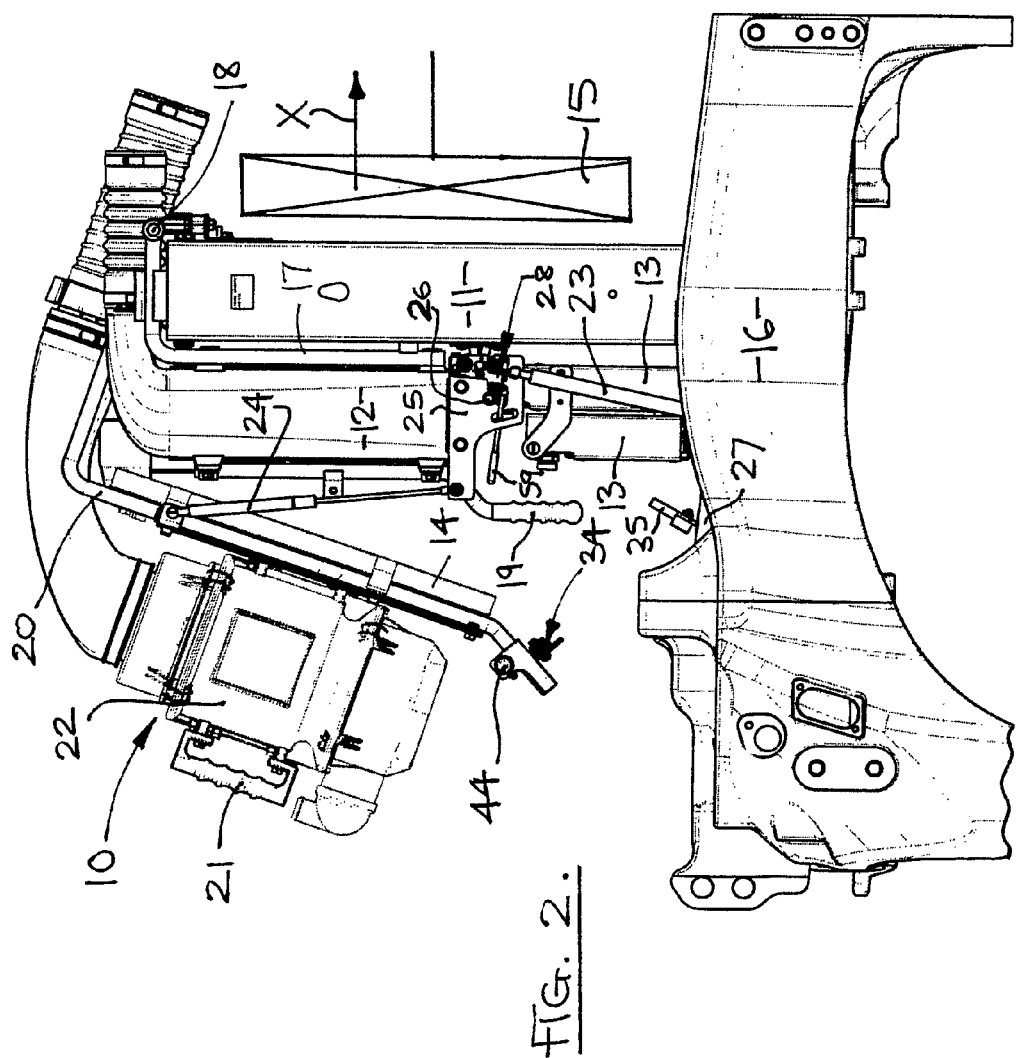
FIG. 2 shows a side view of the installation of FIG. 1 in a partially open position.
Figure 5:
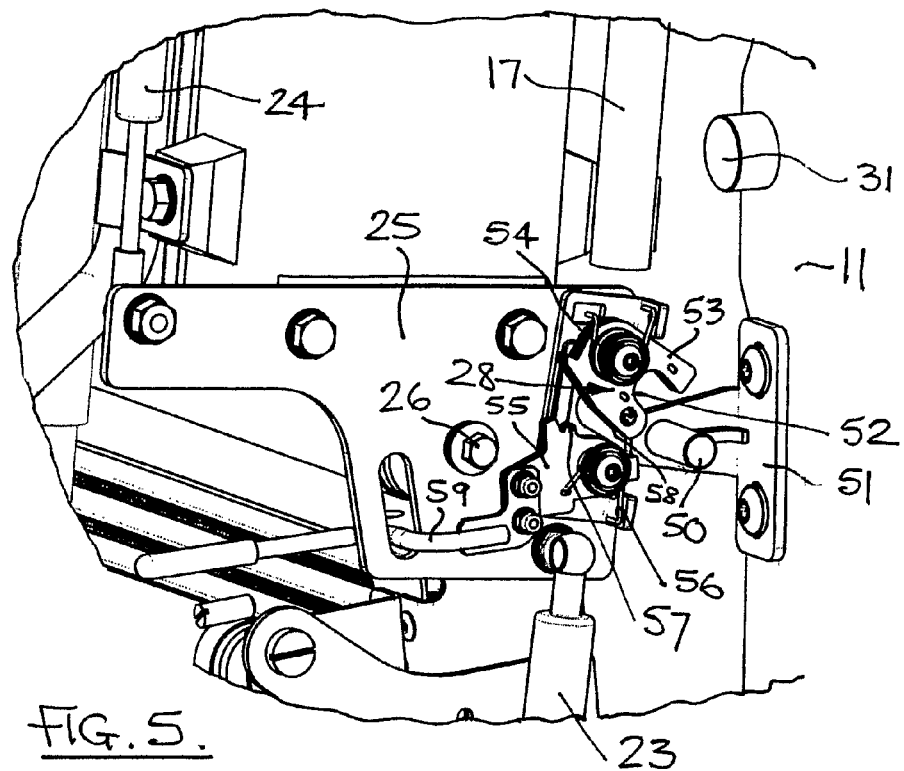
FIGS. 5 and 6 shows a latch used to secure an inner bank of coolers to the engine radiator.
Figure 6:
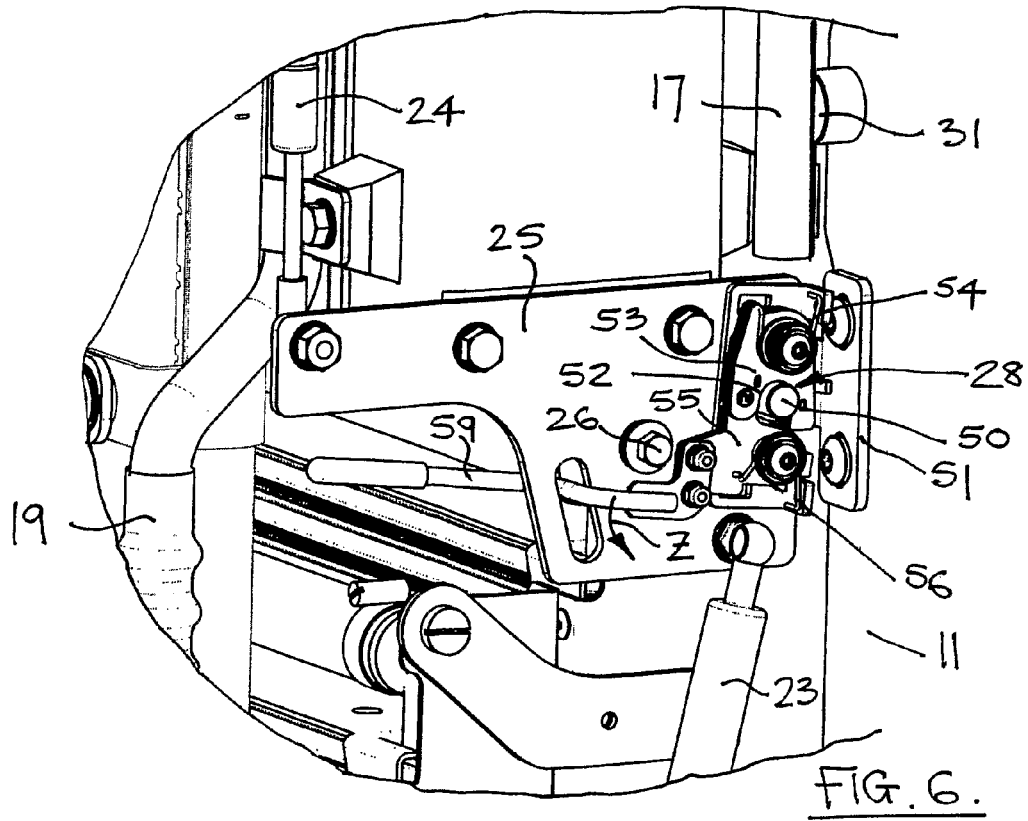

A first latch 28 is provided for securing the first frame 17 in its closed position relative to radiator 11 shown FIGS. 1 and 2. Details of the first latch 28 are shown in FIGS. 5 and 6. As can be seen, this latch compromises a pin 50 which is mounted on the radiator 11 via bracket 51. When the first frame 17 is lowered to its closed position adjacent radiator 11 the. pin 50 enters a recess 52 in a pivoting latch member 53 which is biased to the open FIG. 5 position by a coil spring 54. The pin 50 pivots the latch member 53 clockwise, as viewed in FIG. 5, against the action of the coil spring 54 and also pivots a latch member 55 anticlockwise, as viewed in FIG. 5, against the action of a second coil spring 56. Ultimately a latching surface 57 on latching member 55 contacts a corporating latching surface 58 on latch member 53 to hold the latch member 53 pivoted in a clockwise sense thus retaining the pin 50 captive within the recess 52 as shown in FIG. 6. The latch is released by movement of a lever 59 in the direction of Z of FIG. 6 to disengage the latching formations 57 and 58. Rubber stops 31 mounted on radiator 11 are engaged by frame 17 when latch 28 is closed to ensure a non-vibrating securement of frame 17 to radiator 11 when the tractor is in use.

Figure 7:
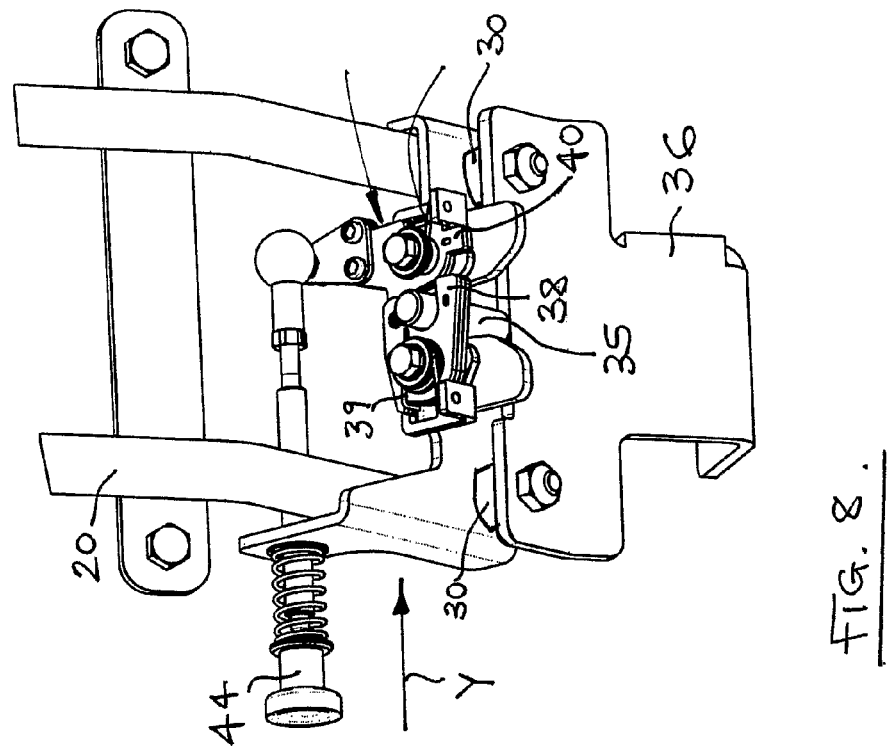
FIGS. 7 and 8 show details of a latch used to secure a second outer bank of coolers in a closed position.
Figure 8:
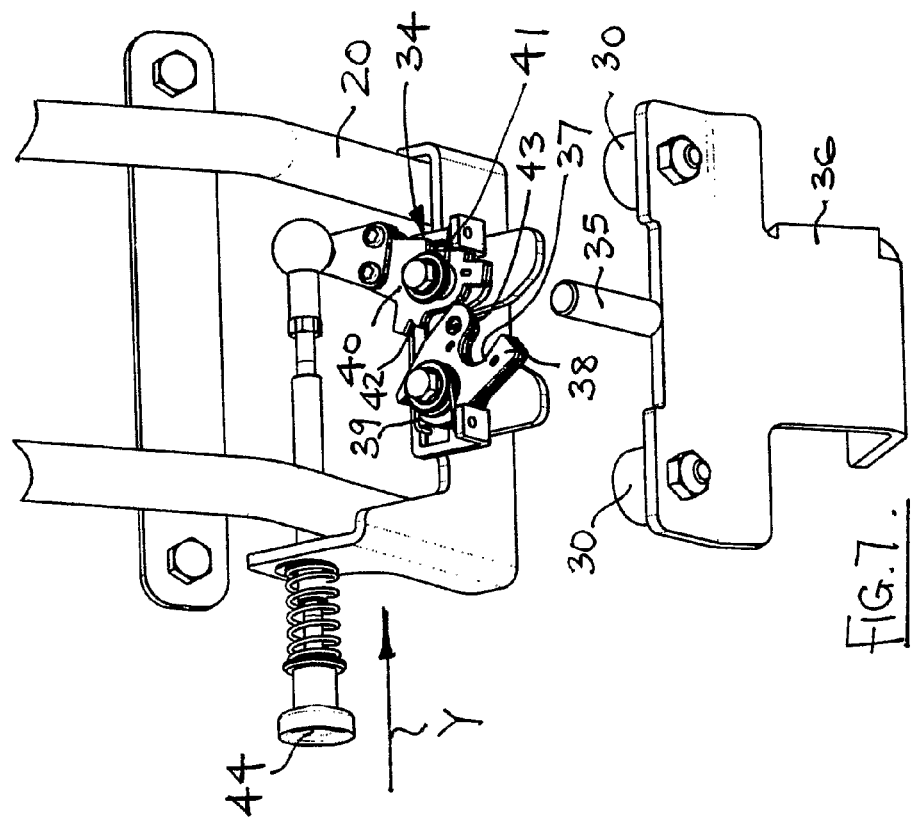

A second latch 34, shown in FIGS. 7 and 8 is provided centrally at the lower portion of second frame 20 for securing the second frame relative to the cast frame 16. This latch comprises a pin 35 which is mounted on the frame 16 via bracket 36. When the second frame 20 is lowered to its closed position the pin 35 enters a recess 37 in a pivoting latch member 38 which is biased to the open FIG. 7 position by a coil spring 39. The pin 35 pivots the latch member 38 anti-clockwise, as viewed in FIG. 7, against the action of coil spring 39 and also pivots a latch member 40 clockwise, as viewed in FIG. 7, against the action of a second coil spring 41. Ultimately a latching surface 42 on latching member 40 contacts a corporating latching surface 43 on latch member 38 to hold the latch member 38 pivoted in a clockwise sense thus retaining the pin 35 captive within the recess 37. The latch is released by movement of a knob 44 in the direction of Y of FIG. 7 to disengage the latching formations 42 and 43. As will be appreciated any suitable form of latch may be used for latches 28 and 34. Rubber stops 30 mounted on a bracket 36 ensure a non-vibrating securement of frame 20 to cast frame 16 when latch 34 is engaged.

As will be evident from the above, the cooling installation can be opened up for cleaning as follows. The latch 34 is released by pressing knob-44 in direction Y and the second frame 20 is pivoted to the FIG. 2 position by gas struts 24 or if necessary, by using handle 21. This allows access to the inner surface of the air condenser 14 for cleaning. If required the first inner bank of coolers 12 and 13 can also be pivoted away from the radiator 11 for cleaning by moving lever 59 in direction Z to allow frame 17 to be moved to the fully open FIG. 3 position by gas struts 23 or, if necessary, by using handle 19.

The first and second banks of coolers are interconnected, as described above via gas struts 24 so that if both latches 34 and 28 are released in quick succession the coolers can be moved to the fully open FIG. 3 position in one smooth movement under the action of the gas struts 23 and 24. As it will be appreciated, in this fully open position both sides of the engine intercooler 12 and oil cooler 13 are accessible for cleaning with air hoses etc.

Thus the cooling installation of the present invention provides a particularly simple but effective manner of mounting the various coolers on the tractor which allows easy cleaning of the coolers when this is required due, for example, to clogging by straw/soil/dust.

The invention claimed is:

1. A tractor cooling installation comprising:
   an engine cooling radiator fixed relative to the tractor,
   a first inner bank of one or more coolers pivoted on the radiator for upward pivoting movement away from the radiator about a first generally horizontal pivot axis transverse to the tractor, and
   a second outer bank of one or more coolers also pivoted on the radiator for upward pivoting movement away from the first inner bank of coolers about a second generally horizontal pivot axis transverse to the tractor;
   wherein the first bank of coolers is mounted on a first frame which pivots about the first axis and the second bank of coolers is mounted on a second frame which pivots about the second axis; and
   wherein a first cooler from the first bank of coolers is mounted on the first frame for pivoting upwardly with the first frame away from the radiator and a second cooler which also forms part of the first bank of coolers is pivotally supported at an upper end from the first frame about a third generally horizontal axis, the lower end of the second cooler being attached to the tractor by pivoting link means so that as the first frame pivots upwardly about the first axis the second cooler pivots relative to the first frame about the third axis to a location spaced from the first cooler and the radiator.

2. An installation according to claim 1 further comprising support means for holding the first frame in a pivoted spaced relation relative to the radiator.

3. An installation according to claim 2 further comprising support means for holding the second frame in a pivoted spaced relation relative to the first frame.

4. An installation according to claim 2 in which the support means comprises gas struts which also assist in pivoting the frame relative to the radiator.

5. An installation according to claim 1 in which the frames are interconnected so that, after a predetermined pivoting movement of the second frame away from the radiator, the first frame begins to pivot away from the radiator.

6. An installation according to claim 1 further comprising an air filter mounted on the second frame.

7. An installation according to claim 1 further comprising latch means for securing the frames in a closed unpivoted position relative to the radiator.

8. An installation according to claim 7 in which the latch means comprises a first latch means for securing the first frame relative to the radiator and a second latch means for securing the second frame relative to the tractor.

9. An installation according to claim 3 in which the support means each comprise gas struts which also assist in pivoting each frame relative to the radiator.

10. An installation according to claim 9, wherein the first and second frames are interconnected via the gas struts which act between the frames.

11. A tractor cooling installation fitted to a tractor comprising:
    an engine cooling radiator fixed relative to the tractor;
    a first cooler mounted on a first frame which is pivoted on the radiator for upward pivoting movement away from the radiator about a first generally horizontal pivot axis transverse to the tractor;
    a second cooler; and
    guiding means attaching a lower end of the second cooler to the tractor;
    wherein the first cooler together with the second cooler forms a first bank of coolers;
    wherein an upper end of the second cooler is pivotally supported from the first frame about a second generally horizontal axis; and
    wherein as the first frame pivots upwardly about the first axis, the guiding means enables the second cooler to pivot relative to the first frame about the second axis to a location spaced from the radiator.

12. An installation according to claim 10, further comprising a second outer bank of one or more coolers also pivoted on the radiator for upward pivoting movement away from the first inner bank of coolers about a third generally horizontal pivot axis transverse to the tractor.

13. An installation according to claim 11, wherein the second bank of coolers is mounted on a second frame which pivots about the third axis.

* * * * *